US006170970B1

(12) United States Patent
Eto

(10) Patent No.: US 6,170,970 B1
(45) Date of Patent: Jan. 9, 2001

(54) VEHICLE LAMP

(75) Inventor: Toyozo Eto, Shizuoka (JP)

(73) Assignee: Koito Manufacturing Co., Ltd., Tokyo (JP)

( * ) Notice: Under 35 U.S.C. 154(b), the term of this patent shall be extended for 0 days.

(21) Appl. No.: 09/255,082

(22) Filed: Feb. 19, 1999

(30) Foreign Application Priority Data

Feb. 20, 1998 (JP) ..................................................... 10-038467

(51) Int. Cl.[7] ................................ B60Q 1/00; F21V 11/00

(52) U.S. Cl. ........................... 362/539; 362/509; 362/547; 362/305; 362/345; 362/361

(58) Field of Search ...................................... 362/539, 300, 362/303, 305, 509, 547, 294, 345, 351, 353, 361

(56) References Cited

U.S. PATENT DOCUMENTS

| | | | |
|---|---|---|---|
| 5,067,054 | 11/1991 | Oshio et al. . | |
| 5,195,815 | 3/1993 | Watanabe et al. . | |
| 5,430,623 | 7/1995 | Uchida . | |
| 5,567,033 | 10/1996 | Tanaka et al. . | |
| 5,782,550 * | 7/1998 | Ohashi et al. | 362/61 |
| 5,971,575 * | 10/1999 | Matubara | 362/510 |

* cited by examiner

*Primary Examiner*—Sandra O'Shea
*Assistant Examiner*—Ali Alavi
(74) *Attorney, Agent, or Firm*—Koda & Androlia

(57) ABSTRACT

A vehicle headlamp having a clear front lens, light bulb and a shade that covers a front portion of the light bulb, in which the shade has an octagonal cylindrical portion, and slits extending in the axial direction of the cylindrical portion are formed in the ridges formed by adjacent flat surfaces that constitute the octagonal cylindrical shape of the cylindrical portion, thus allowing heat generated by the light bulb to be released out of the shade, preventing a glare light.

9 Claims, 3 Drawing Sheets

VEHICLE LAMP

BACKGROUND OF THE INVENTION

1. Field of the Invention

The present invention relates to a vehicle lamp and more particularly to a vehicle lamp that has a shade which covers a light source for preventing generation of dazzling light rays.

2. Prior Art

It is well known that a vehicle lamp includes an element that is called shade. The shade covers at least the front end portion of a light source so as to prevent light rays emitted from the light source from becoming dazzling light rays which is generally called a "glare light".

In the above vehicle lamp, however, heat generated by the light source is likely to accumulate within the shade without escaping, which increases the temperature of the area around the light source.

When the temperature of the area around the light source increases, various problems occur. For example, exfoliation of the plating applied to the shade occurs, thus darkening the shade, and the life of the light source is shortened. The heat accumulated inside the shade also likely to damage a leg portion of the shade which supports the shade to a reflector or a lamp body. So as to avoid this, the leg portion may be provided on the side surface of the shade; however, with this structure, the light rays emitted from the light source and laterally directed will be blocked by the leg portion, resulting in that the quantity of light becomes insufficient.

If the shade is designed so as to cover only the front portion of the light source in order to avoid the heat generated by the light source from accumulating in the shade, the light rays emitted in the lateral and downward directions are reflected by the side surface and lower surface of the reflector, respectively. If this occurs, the pedestrian may be dazzled by the glare of the light laterally emitted from the lamp of the approaching vehicle. The driver of the vehicle may also be dazzled by the glare of the light emitted upward from the lamp of the approaching vehicle if the approaching vehicle has the shade described above. In case of driving in the rain, such a dazzling light may result in optical film phenomenon in the front of the vehicle.

SUMMARY OF THE INVENTION

Accordingly, the object of the present invention is to provide a vehicle lamp that can prevent a generation of the glare light and decrease the temperature around the light source of the vehicle lamp that has a shade covering the light source.

In order to accomplish the object, in the vehicle lamp of the present invention, the shade is provided with a slit which extends in the axial direction of the shade from the open rear end of the shade.

Accordingly, the vehicle lamp of the present invention can keep the temperature around the light source low without allowing the heat generated by the light emitted from the light source to accumulate inside the shade and can prevent the light rays from radiating to the front of the light source, thus eliminating glare light.

DETAILED DESCRIPTION OF THE PREFERRED EMBODIMENTS

Figure 1:
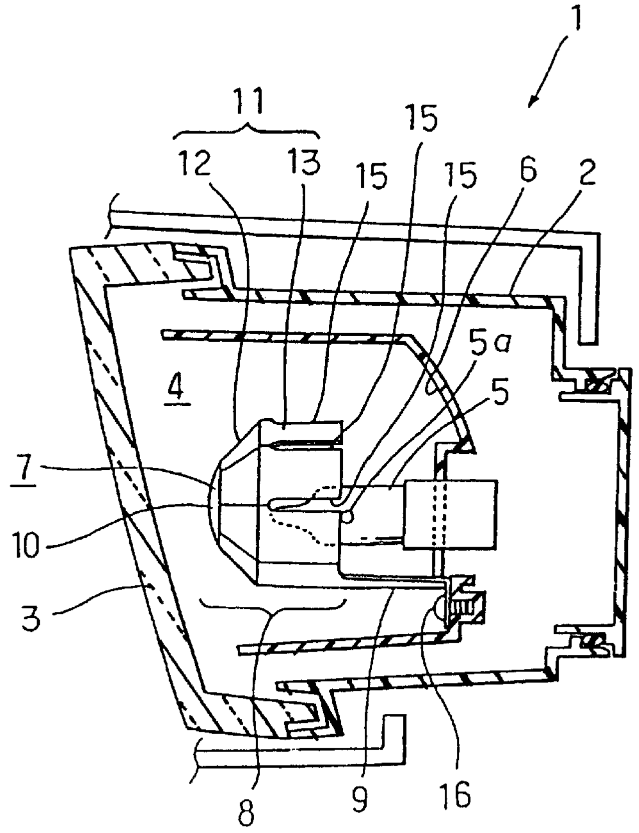
FIG. 1 is a vertical sectional view of one embodiment of the vehicle headlamp according to the present invention.
Figure 2:
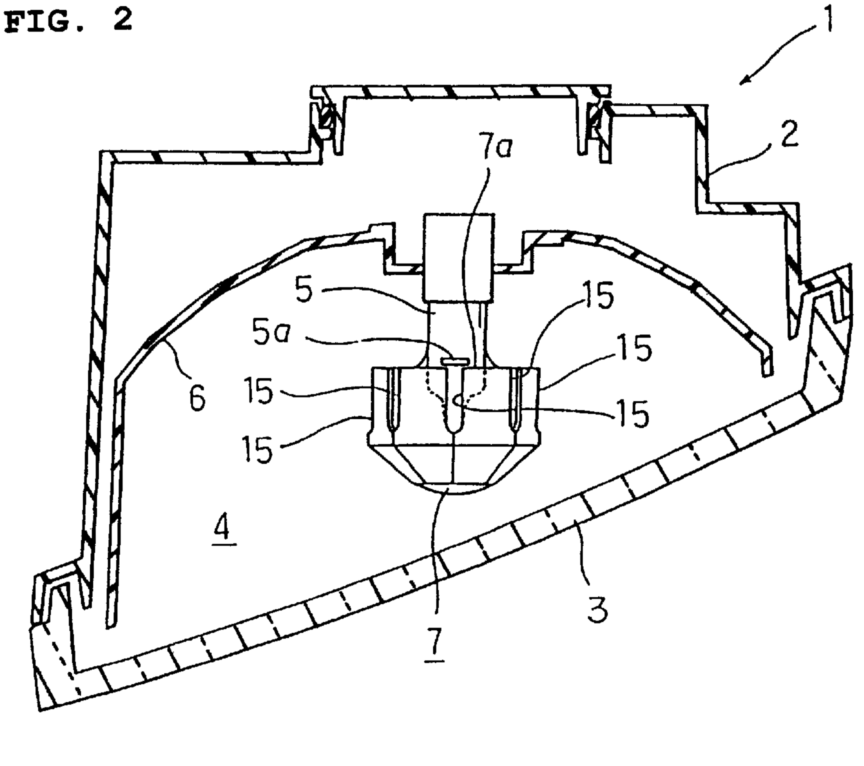
FIG. 2 is a horizontal sectional view thereof.

One embodiment of the vehicle lamp according to the present invention will be described below with reference to the accompanying drawings. The embodiment will be described about a headlamp used in an automobile.

The vehicle headlamp 1 comprises a lamp body 2 with a recess portion open to the front thereof, a front lens 3 which covers the front open end of the lamp body 2, and a reflector 6 which holds a light bulb 5 disposed in a light chamber 4 which is defined by the lamp body 2 and the front lens 3.

The front lens 3 is a clear lens provided with no lens-steps so that the inside of the light chamber 4 can be clearly seen through the front lens 3 from the front of the vehicle headlamp 1.

The light bulb 5 is provided so that the filament **5*a* thereof is disposed horizontally and perpendicular to the optical axis of the light bulb 5. In addition, a shade 7 is provided in front of the light bulb 5**.

The shade 7 comprises a cap-like shade main body 8 and a leg 9 which are formed in an integral single body. The shade main body 8 of the shade 7 has a polygonal shape (a octagonal shape in the shown embodiment) when viewed from the front (left side in FIG. 1), and its rear end (right end in FIG. 1) is opened. The leg 9 of the shade 7 projects, as seen from FIG. 1, rearward from the rear bottom edge of the shade main body 8, and a fitting portion **9*a*** is formed at the rear end thereof.

Figure 5:
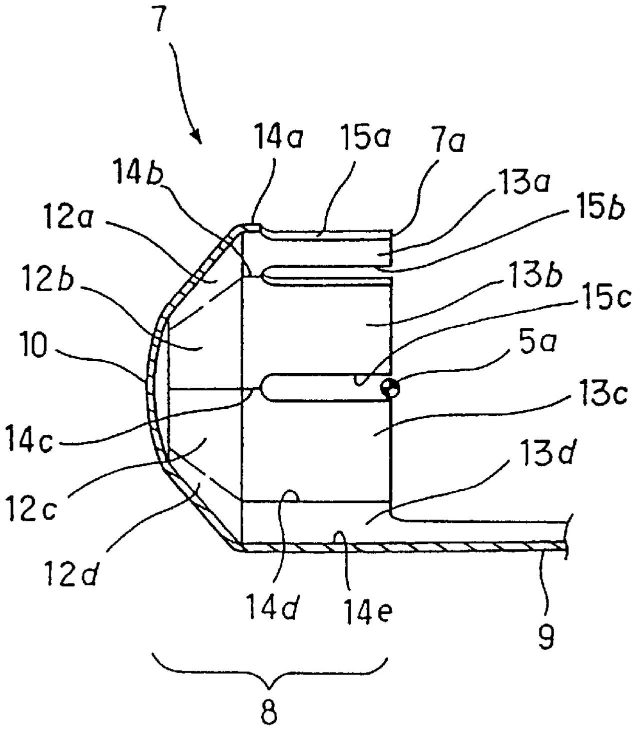
FIG. 5 is a longitudinally sectional side view thereof.

The shade main body 8 comprises, as best seen from FIG. 5, a front portion 10 and a peripheral wall portion 11. The front portion 10 has an annular shape when viewed form the front, and the surface thereof forms an arc slightly projecting forward. The peripheral wall portion 11 continuously extends rearward from the peripheral edge of the front portion 10 and includes a front end portion 12 and a cylindrical portion 13. The front end portion 12 has a shape in which the diameter thereof gradually widens rearward, and the cylindrical portion 13 is formed continuously from this front end portion 12. The cylindrical portion 13 has a diameter which is substantially unchanged for the entire length thereof.

Figure 4:
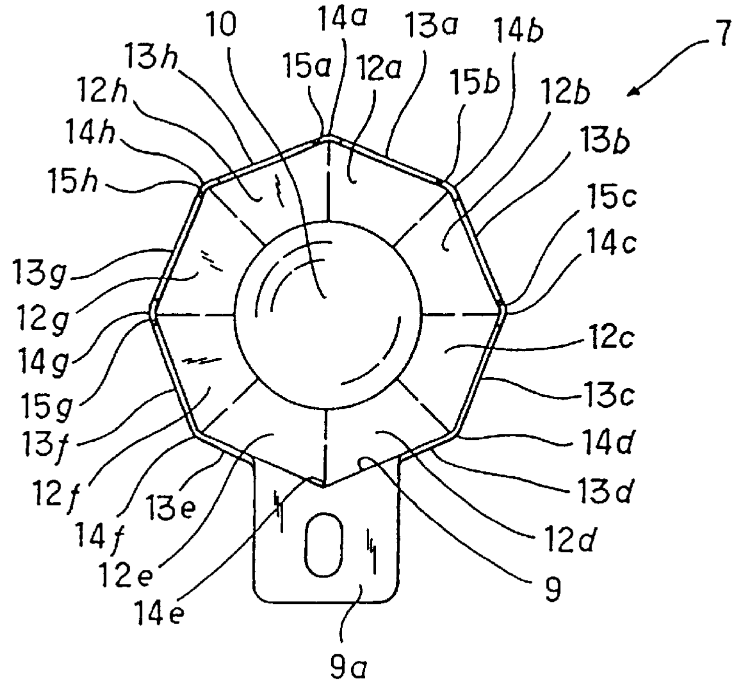
FIG. 4 is a rear elevational view of the shade.

The front end portion 12 has an octagonal cone shape defined by eight frontal surfaces **12*a* through 12*h* with 45 degrees apart from next to each other. More specifically, the front end portion 12 comprises: a top left (top right in FIG. 4) frontal surface 12*a* which is slanted so as to have an upward rear portion, au upper left (upper right in FIG. 4) frontal surface 12*b* continuous from the lower edge of the top left frontal surface 12*a* and slanted so as to have an upward left portion, a lower left (lower right in FIG. 4) frontal surface 12*c* continuous from the lower edge of the upper left upper frontal surface 12*b* and slanted so as to have an downward left portion, a bottom left (bottom right in FIG. 4) frontal surface 12*d* continuous from with the lower edge of the lower left frontal surface 12*c* and slanted so as to have an downward rear portion, a bottom right (bottom left in FIG. 4) frontal surface 12*e* continuous from the lower edge of the bottom left frontal surface 12*d* and slanted so as to have an downward rear portion, a lower right (lower left in FIG. 4) frontal surface 12***f* continuous from the upper edge of the bottom right frontal surface 12*e* and slanted so as to have an downward right portion, an upper right (upper left in FIG. 4) frontal surface 12*g* continuous from the upper edge of the lower right frontal surface 12*f* and slanted so as to have an upward right portion, and a top right (top left in FIG. 4) frontal surface 12*h* continuous from the upper edge of the upper right frontal surface 12*g* and continuous to the top left frontal surface 12*a* and slanted so as to have an upward rear portion.

Furthermore, the cylindrical portion 13 has an octagonal cylindrical shape defined by eight (8) flat side surfaces 13*a* to 13*h* which are respectively formed continuously from the rear end edges of the corresponding frontal surfaces 12*a* through 12*h* of the front end portion 12. The eight (8) side surfaces 13*a* to 13*h* are continuous to each other at both side edges of the adjacent side surfaces.

Since the cylindrical portion 13 is formed in an octagonal cylindrical shape, angular portions 14*a* through 14*h* (hereinafter referred to as a boundary portion) are defined by the respective side surfaces 13*a* to 13*h* of the cylindrical portion 13 and corresponding adjacent surfaces 13*h* to 13*a*. More specifically, the boundary portion 14*a* is defined by two side surfaces 13*h* and 13*a*, a boundary portion 14*b* is defined by two side surfaces 13*a* and 13*b*, and the boundary portions 14*c* to 14*h* are likewise defined by the respective two side surfaces 13*b* through 13*h*.

The shape of the cylindrical portion 13 is not limited to the octagonal cylinder. It may be formed in a circular cylinder or other polygonal cylinder, for example, hexagonal cylinder or decagonal cylinder. Alternatively, it may be formed in a cone shape having a larger diameter towards the rear portion of the cylindrical portion.

In the thus formed cylindrical portion 13, slits are formed. More specifically, a slit 15*a* is formed in a top boundary portion 14*a*, a slit 15*b* is formed in an upper left (upper right in FIG. 4) boundary portion 14*b*, a slit 15*c* is formed in a left side (right side in FIG. 4) boundary portion 14*c*, a slit 15*g* is formed in a right side (left side in FIG. 4) boundary portion 14*g*, and a slit 15*h* is formed in an upper right (upper left in FIG. 4) boundary portion 14*h*.

As seen from FIG. 5, each of the slits 15*a*, 15*b*, 15*c*, 15*g* and 15*h* is formed so as to open from the open rear end 7*a* of the shade 7 and extends in the axis direction of the cylindrical portion 13 towards the front end portion 12.

Figure 3:
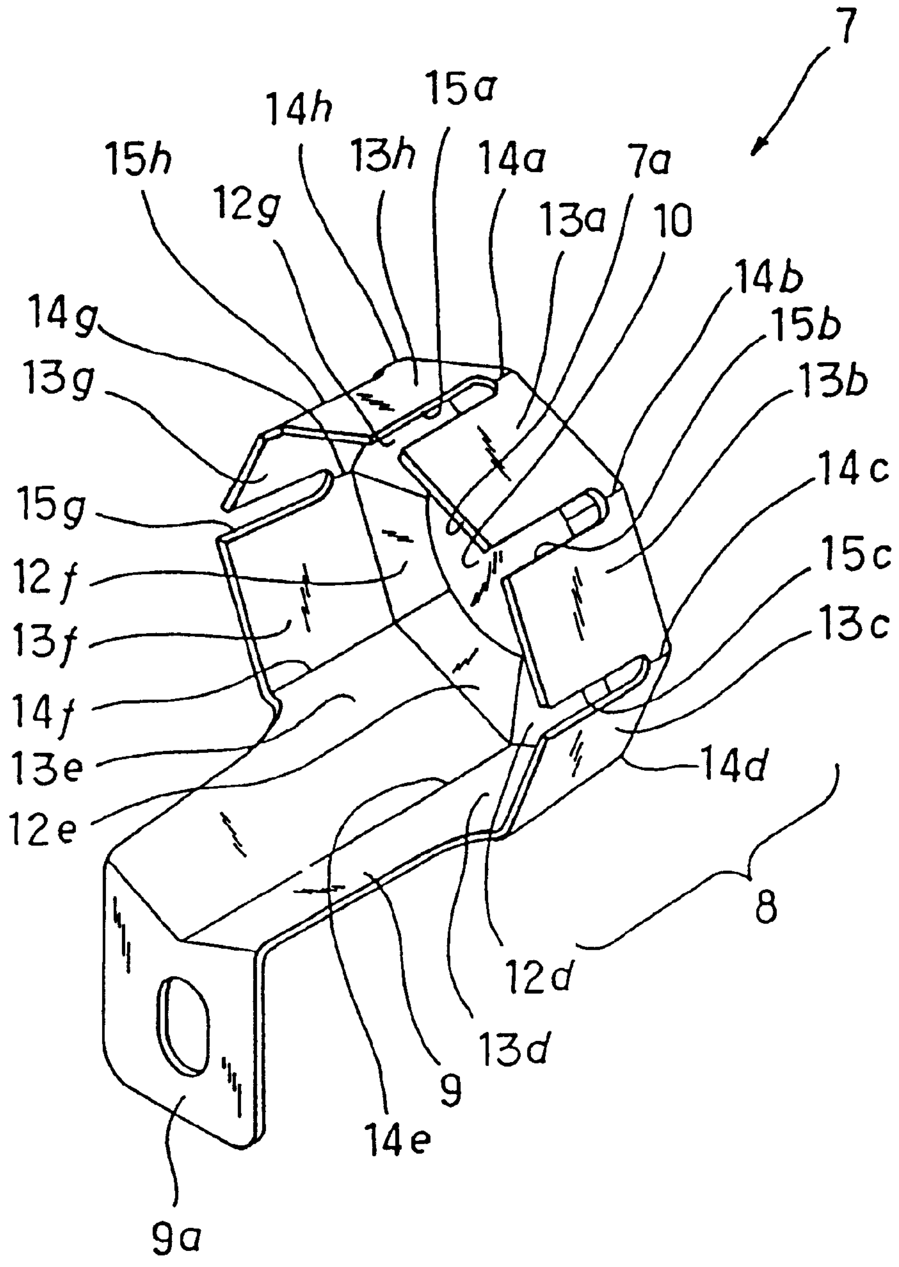
FIG. 3 is an enlarged perspective view substantially taken from the top and rear of the shade used in the headlamp of the present invention.

Each slit has a length so that the front end thereof reaches the point in the vicinity of the front end of the cylindrical portion 13 as seen from FIGS. 3 and 5 and has a width of 1.5 mm.

Since the slits 15*a* through 15*h* have a length that is enough to reach the point in the vicinity of the front end of the cylindrical portion 13, the air flow existing deep (front portion) in the shade 7 is promoted, thus improving the heat releasing effect. In addition, since the slits do not reach the boundary between the cylindrical portion 13 and the front end portion 12, the strength of the shade 7 itself is impaired.

The results of the tests carried out by the inventor show that if the width of the slit is 2 mm or greater, the quantity of light (leaked light) emitted through the slit 15 is too large. As a result, noticeable leakage of light may occur, impairing the outer appearance; and in some occasion, the glare light is generated. If the width of the slit 15 is too small, the amount of air passing through the respective slit 15 is reduced; and the result is that the heat releasing effect fails to reach a satisfactory level as expected.

Thus, the results of the tests prove that with the silts being of 1.5 mm wide, an appropriate heat releasing effect is obtained and the generation of the glare light is efficiently prevented.

The leg 9 extends rearward from the rear end of two side surfaces 13*d* and 13*e* that constitute the lower section of the cylindrical portion 13. In other words, the leg 9 is bent along the center line extending in the lengthwise direction thereof so that the leg 9 is bent at the same angle as the angle that is defined by the two side surfaces 13*d* and 13*e*. Thus, the leg 9 has high rigidity.

Since the leg 9 is provided in the lower section of the shade 7, the leg 9 is not visually identified even though the front lens 3 is a clear lens. Therefore, the outer appearance of the headlamp is not impaired. In other words, though the vehicle headlamp 1 is generally seen from a higher visual point, since the leg 9 is formed in the lower section of the shade 7, the leg 9 is hardly identifiable.

With the structure above, the shade 7 is mounted to the reflector 6 by a screw 16 fitted on a fitting portion 9*a* of the leg 9.

In the above vehicle headlamp 1, the shade 7 has five (5) slits 15*a*, 15*b*, 15*c*, 15*h* and 15*g* so that the heat generated by light emission of the light bulb 5 escapes upward, and the air within the shade 7 is promoted to flow. Therefore, the heat does not accumulate in the shade 7, and the temperature of the area around the light bulb 5 is prevented from rising. As a result, various problems which would result from the high temperature around the light bulb 5 can be avoided.

In addition, since the slits 15*a*, 15*b*, 15*c*, 15*h* and 15*g* are formed at positions equal to or above a horizontal plane that passes the center axis of cylindrical portion 13. Accordingly, the shade 7 is hardly deformed by the vibration of the vehicle headlamp 1 even if only one leg 9 is formed on the shade 7.

If the slits are formed near the leg 9 of the shade 7, the portion above the slits has an excessively large weight; and this may cause the space of the open end of the slit 15 to vary due to the vibration of the vehicle headlamp 1, thus deforming or breaking the shade 7.

However, in view of the position of the slit made in this embodiment, the portion above the slits does not have an excessively large weight. Accordingly, the shade 7 hardly deforms nor breaks due to vibration.

The tests the inventor conducted indicates that if the slits are formed in the boundary portions 14*d* and 14*f* and in the boundary portions (14*a*, 14*b*, 14*c*, 14*g*, 14*h*) located above these boundary portions 14*d* and 14*f*, the rigidity of the shade 7 is not impaired even if the shade 7 is supported with one leg 9 disposed at the lower portion thereof. In other words, in the present invention, it is possible to form the slits above the lower right and lower left boundary portions 14*d* and 14*f* which are located 45 degrees below an imaginary horizontal plane that passes the axis of the shade 7 or passes the boundary portions 14*c* and 14*g*.

The cylindrical portion 13 of the shade 7 is formed into an octagonal shape, and the resultant boundary portions have slits 15*a* to 15*h* respectively. As a result, when the vehicle headlamp 1 is seen from the front, these slits are hardly identified; and the slits do not impair the outer appearance of the vehicle headlamp 1.

Since the slits are formed in the upper portion of the shade 7, the heat inside the shade 7 can be efficiently released through the slits. Accordingly, the shade has an improved heat releasing effect.

As seen from the above, in the vehicle headlamp of the present invention which has a front lens, a light source and a shade for covering the light source, slits are opened from the rear end of the shade in the axis direction of the shade, and the heat generated by the light source does not accumulate inside the shade. Therefore, no significant temperature rise occurs in the area around the light source. Furthermore even when the light ray leaks out of the shade, it goes out through the slits. Therefore, the quantity of the leaked out light is too small to generate the glare light.

Further, the rear portion of the shade is in a polygonal cylinder shape that has a plurality of flat surfaces, and a slit is formed in each of the boundary portions between adjacent flat surfaces constituting the polygonal cylinder. Therefore, the slit is hardly noticeable, thus preventing impairment of the outer appearance of the headlamp when seeing the lamp from the front.

Furthermore, since the slits are formed in the upper portion of the shade, the rising air flow due to the heat generated by the light source can easily escape efficiently from the shade, thus improving the heat releasing effect.

In addition, since each slit has a width equal to or less than 2 mm, the quantity of the light leaking through the slit is minimized to a negligible level, thus preventing the generation of the glare light.

Furthermore, the shade is mounted to the reflector via a single leg that extends rearward from the lower portion of the open rear end of the shade, and the slits are formed at the positions above the lower right and lower left boundary portions of the octagonal cylindrical portion of the shade. As a result, the outer appearance of the vehicle lamp is hardly impaired when seen from the front. In addition, though the slits are made, it is unlikely that the shade deforms nor breaks due to vibration.

Configurations and structures of the elements in the embodiments above are explained as mere examples showing how the present invention is applied. Therefore, it should be clearly understood that the scope of claims of the present invention is not restricted to the foregoing description.

What is claimed is:

1. A vehicle lamp comprising a front lens, a light source and a shade that covers said light source for preventing light rays emitted from the light source from becoming dazzling light rays, wherein said shade is provided with a slit, one end of said slit opening at an open rear end of said shade, said slit having a width sufficient to prevent a significant temperature rise from occurring in an area around the light source but small enough to prevent a quantity of leaked out light rays from generating dazzling light rays.

2. A vehicle lamp according to claim 1, wherein:

a rear portion of said shade is in a polygonal cylindrical shape; and said slit is formed at a boundary between adjacent side surfaces that constitute said polygonal cylindrical shape.

3. A vehicle lamp according to claim 1 or 2, wherein said slit is formed in an upper portion of said shade.

4. A vehicle lamp according to claim 3, wherein:

said vehicle lamp further comprises a reflector, and said shade is mounted to said reflector at one leg extending rearward from a lower section of said open rear end of said shade; and said slit is formed above points which are located 45 degrees below an imaginary horizontal plane that passes an axis of said shade.

5. A vehicle lamp according to claim 1 or 2, wherein:

said vehicle lamp further comprises a reflector, and said shade is mounted to said reflector at one leg extending rearward from a lower section of said open rear end of said shade; and said slit is formed above points which are located 45 degrees below an imaginary horizontal plane that passes an axis of said shade.

6. A vehicle lamp comprising a front lens, a light source and a shade that covers said light source for preventing light rays emitted from the light source from becoming dazzling light rays, wherein said shade is provided with a slit, one end of said slit opening at an open rear end of said shade and said slit has a width equal to or less than 2 mm.

7. A vehicle lamp according to claim 6, wherein:

said vehicle lamp further comprises a reflector, and said shade is mounted to said reflector at one leg extending rearward from a lower section of said open rear end of said shade; and said slit is formed above points which are located 45 degrees below an imaginary horizontal plane that passes an axis of said shade.

8. A vehicle lamp comprising a front lens, a light source and a shade that covers said light source for preventing light rays emitted from the light source from becoming dazzling light rays, wherein said shade is provided with a slit, one end of said slit opening at an open rear end of said shade, said slit is formed in an upper portion of said shade and said slit has a width equal to or less than 2 mm.

9. A vehicle lamp according to claim 8, wherein:

said vehicle lamp further comprises a reflector, and said shade is mounted to said reflector at one leg extending rearward from a lower section of said open rear end of said shade; and said slit is formed above points which are located 45 degrees below an imaginary horizontal plane that passes an axis of said shade.

* * * * *